(12) United States Patent
Lan et al.

(10) Patent No.: US 11,036,430 B2
(45) Date of Patent: Jun. 15, 2021

(54) PERFORMANCE CAPABILITY ADJUSTMENT OF A STORAGE VOLUME

(71) Applicant: International Business Machines Corporation, Armonk, NY (US)

(72) Inventors: Long Wen Lan, Shanghai (CN); Yang Liu, Pudong (CN); Duo Chen, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 16/449,603

(22) Filed: Jun. 24, 2019

(65) Prior Publication Data
US 2020/0401343 A1 Dec. 24, 2020

(51) Int. Cl.
*G06F 3/06* (2006.01)

(52) U.S. Cl.
CPC ............ *G06F 3/0659* (2013.01); *G06F 3/061* (2013.01); *G06F 3/0644* (2013.01); *G06F 3/0647* (2013.01); *G06F 3/0673* (2013.01)

(58) Field of Classification Search
CPC ...... G06F 3/0685; G06F 3/061; G06F 3/0649; G06F 11/3452; G06F 3/0683; G06F 3/0629; G06F 3/0647; G06F 3/0659; G06F 3/0673; G06F 3/0644
See application file for complete search history.

(56) References Cited

U.S. PATENT DOCUMENTS

| | | | |
|---|---|---|---|
| 7,363,453 B1 * | 4/2008 | Arnan | G06F 3/061 707/999.002 |
| 7,693,876 B2 * | 4/2010 | Hackworth | G06F 3/0605 709/224 |
| 9,665,288 B1 * | 5/2017 | Aharoni | G06F 3/0649 |
| 10,078,569 B1 | 9/2018 | Alshawabkeh et al. | |
| 2016/0004475 A1 * | 1/2016 | Beniyama | G06F 3/067 710/74 |
| 2017/0063629 A1 | 3/2017 | Ciano et al. | |

(Continued)

OTHER PUBLICATIONS

Grozev et al., "Dynamic Selection of Virtual Machines for Application Servers in Cloud Environments", Technical Report CLOUDS-TR-2016-1, Cloud Computing and Distributed Systems Laboratory, The University of Melbourne, Feb. 7, 2016, 26 pages, arXiv:1602.02339v1 [cs.DC] Feb. 7, 2016.

(Continued)

*Primary Examiner* — Zhuo H Li
(74) *Attorney, Agent, or Firm* — William H. Hartwell

(57) ABSTRACT

Computer software that adjusts a performance capability of a storage volume by (i) determining a current storage volume to store data having a workload pattern, wherein a cycle of the workload pattern includes a hot period and a cold period, (ii) determining a time limit window of the current storage volume, wherein the time limit window is a shortest time window within which performance capability of the current storage volume is to be kept without adjustment, (iii) determining a low performance period of the current storage volume corresponding to the cold period, and (iv) in response to the low performance period being greater than or equal to the time limit window, reducing the performance capability of the current storage volume during the low performance period.

20 Claims, 9 Drawing Sheets

(56) References Cited

U.S. PATENT DOCUMENTS

2020/0133702 A1* 4/2020 Sharma ................ G06F 9/5088

OTHER PUBLICATIONS

Jamshidi et al., "Autonomic Resource Provisioning for Cloud-Based Software", SEAMS'14, Jun. 2-3, 2014, Hyderabad, India, 10 pages, Copyright 2014 ACM 978-1-4503-2864-7/14/06, <https://www.computing.dcu.ie/~pjamshidi/PDF/SEAMS2014.pdf>.
Lim et al., "Automated Control for Elastic Storage", ICAC'10, Jun. 7-11, 2010, Washington, DC, USA, 10 pages, Copyright 2010 ACM 978-1-4503-0074-2/10/06, <https://www2.cs.duke.edu/nicl/pub/papers/elastore-icac10.pdf>.
Mell et al., "The NIST Definition of Cloud Computing", Recommendations of the National Institute of Standards and Technology, Special Publication 800-145, Sep. 2011, 7 pages.
Shue et al., "Performance Isolation and Fairness for Multi-Tenant Cloud Storage", USENIX Association, 10th USENIX Symposium on Operating Systems Design and Implementation (OSDI '12), Oct. 8-10, 2012, Hollywood, CA, pp. 349-362, <https://www.usenix.org/system/files/conference/osdi12/osdi12-final-215.pdf>.
Zhang et al., "Adaptive Data Migration in Multi-tiered Storage Based Cloud Environment", 2010 IEEE 3rd International Conference on Cloud Computing, pp. 148-155, © 2010 IEEE, DOI 10.1109/CLOUD.2010.60, <https://ieeexplore.ieee.org/document/5558000/>.

* cited by examiner

PERFORMANCE CAPABILITY ADJUSTMENT OF A STORAGE VOLUME

BACKGROUND

The present invention generally relates to storage and more specifically, relates to performance capability adjustment of a storage volume.

Automated tiered storage is the automated progression or demotion of data across different tiers (types) of storage devices and media. The movement of data takes place in an automated way with the help of software or embedded firmware and is assigned to the related media according to performance and capacity requirements. Data is migrated between tiers based on policies and data usage patterns. Value and efficiency of an SSD is improved by placing only frequently accessed data on expensive storage media. Cache tiering involves creating a pool of relatively fast/expensive storage devices (e.g., solid state drives) configured to act as a cache tier, and a backing pool of either erasure-coded or relatively slower/cheaper devices configured to act as an economical storage tier.

SUMMARY

According to an aspect of the present invention, there is a method, computer program product and/or system that performs the following operations (not necessarily in the following order): (i) determining a current storage volume to store data having a workload pattern, wherein a cycle of the workload pattern includes a hot period and a cold period, (ii) determining a time limit window of the current storage volume, wherein the time limit window is a shortest time window within which performance capability of the current storage volume is to be kept without adjustment, (iii) determining a low performance period of the current storage volume corresponding to the cold period, and (iv) in response to the low performance period being greater than or equal to the time limit window, reducing the performance capability of the current storage volume during the low performance period.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
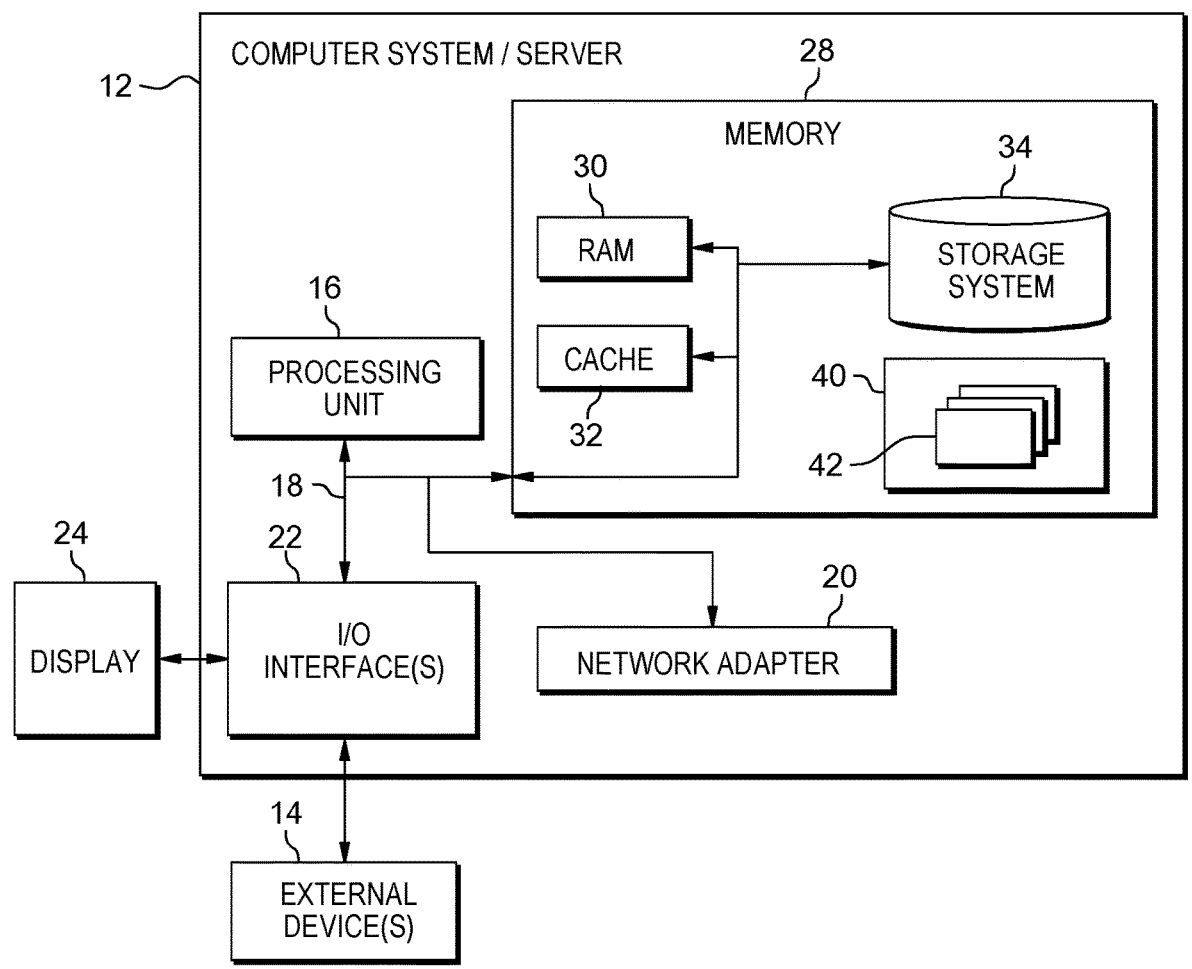
FIG. 1 depicts a cloud computing node according to an embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
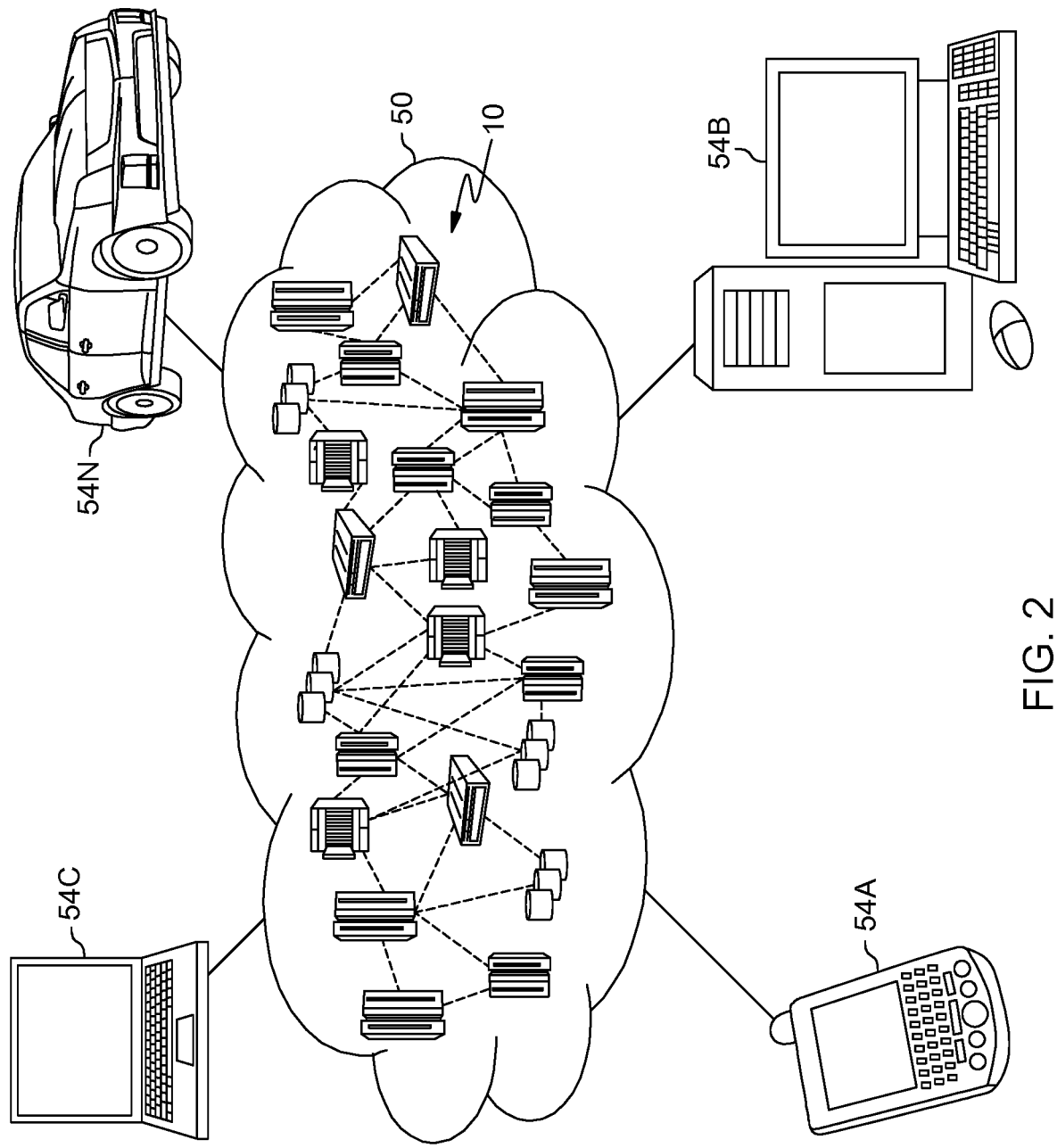
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
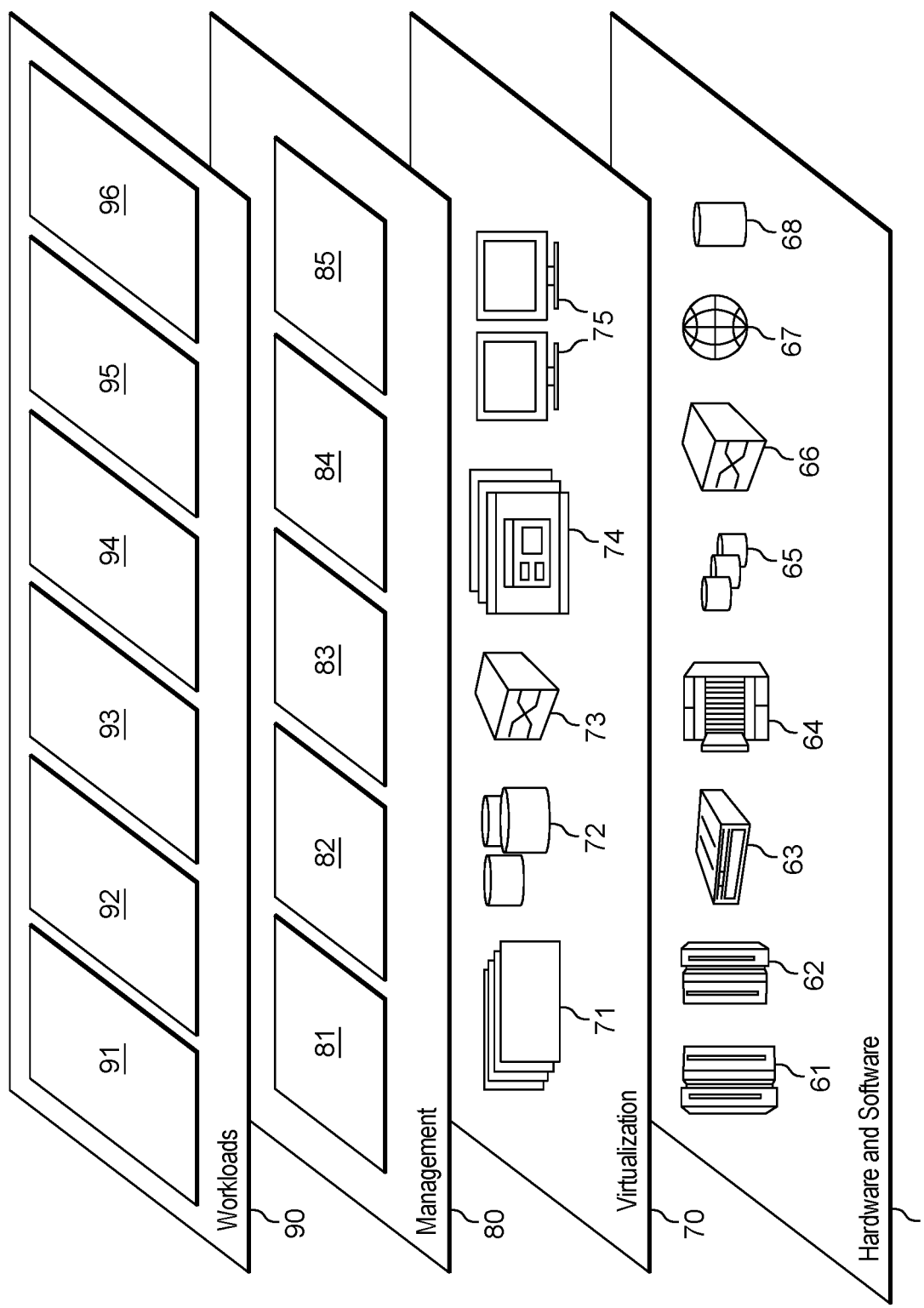
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and performance capability adjustment of a storage volume 96.

Cloud storage is a model of computer data storage in which the digital data is stored in logical pools. The physical storage spans multiple servers (sometimes in multiple locations), and the physical environment is typically owned and managed by a hosting company. Cloud storage is based on highly virtualized infrastructure and is like broader cloud computing in terms of accessible interfaces, near-instant elasticity and scalability, multi-tenancy, and metered resources. In cloud storage, companies need only pay for the storage they actually use. This does not mean that cloud storage is less expensive.

Current automated tiering solutions are not necessarily always suitable for cloud storage, because workloads may be complex on cloud storage, and the provisioned performance capability may not be able to be fully utilized. Current solutions may need lots of data migration and may consume too much time to achieve an optimized result. During data migration, for example, data will be migrated from a source storage volume to a target storage volume. As such, two volumes will be occupied during this migration period. The longer the migration period or the more frequent the migration needed, the higher the storage cost required. In cloud storage, performance capability for a cloud volume can be adjusted directly. A user can use this adjustment feature to reduce the migration cost, and also can save the waste of TOPS (Input/Output Operations Per Second, which can be used to measure performance capability of storage volume) on cloud storage when the workload has subsided. However, cloud storage tuning has limitations. In order to avoid waste of the performance capability, most cloud storage providers will set a time limit window during which performance capability of a cloud volume should be kept consistent without adjustment. It is desired for a solution to reduce the need for complicated management of data migration and to save cost by adjusting performance capability.

Some abbreviations referred in this Detailed Description and in the Figures are defined as follows:
TLW=Time limit window
LPP=Low performance period
LPPc=Low performance period of a current storage volume
LPPn=Low performance period of a new storage volume
LPPe=Low performance period of an existing storage volume
PC=performance capability
Tr=Time to reduce performance capability
Ti=Time to increase performance capability
Tm=Migrate data to a new storage volume
Tt=Terminate a current storage volume
Tc=Create a new storage volume
Tt=Terminate a current storage volume
Tmc=Migrate data in a current storage volume to an existing storage volume
Tme=Migrate data in an existing storage volume to a backup storage volume Embodiments of the present invention adjust performance capability of a storage volume (such as a cloud storage volume) in a cold period to achieve cost-effectiveness (or in other words, meet a performance goal with low cost). For storage volumes in which self-adjustment is eligible (which will be further described below in detail with reference to FIG. 4), storage cost can be saved by adjusting the performance capability in a storage volume without data migration.

In some embodiments, an I/O monitor collects I/O statistics per extent (a range of sequential blocks) from an I/O stack, and feeds the I/O statistics to a workload pattern analyzer per a period of time. The workload pattern analyzer is a machine learning engine that has been trained to recognize workload patterns from the I/O statistics in time series and send the results to the I/O monitor. Workload pattern parameters may include: I/O type (read/write), I/O count, I/O size, time phase, period length, and pattern type. The I/O type, I/O count, and I/O size describe I/O intensity and type in time phase, the period length defines the window length of the workload, and the pattern type gives a tag to indicate the workload type as one of: static, growing, periodic, and unpredictable. The I/O monitor can also transfer workload pattern results to a cloud volume manager. The cloud volume manager uses the workload pattern info to partition data, where data with the same (or similar) patterns will be placed in the same cloud volume. The cloud volume manager also manages and schedules the cloud resources to minimize cost and meet performance goals.

In some embodiments, the cloud volume manager groups similar workload patterns on an extent level, where similar workload patterns have the same period length and pattern type (I/O intensity can be different, but more similar I/O intensity can result in better utilization of cloud provisioned TOPS). After grouping, the cloud volume manager divides extent groups into the smallest size of cloud volumes, to guarantee that data placement and performance adjustment can be at a finer granularity.

Figure 4:
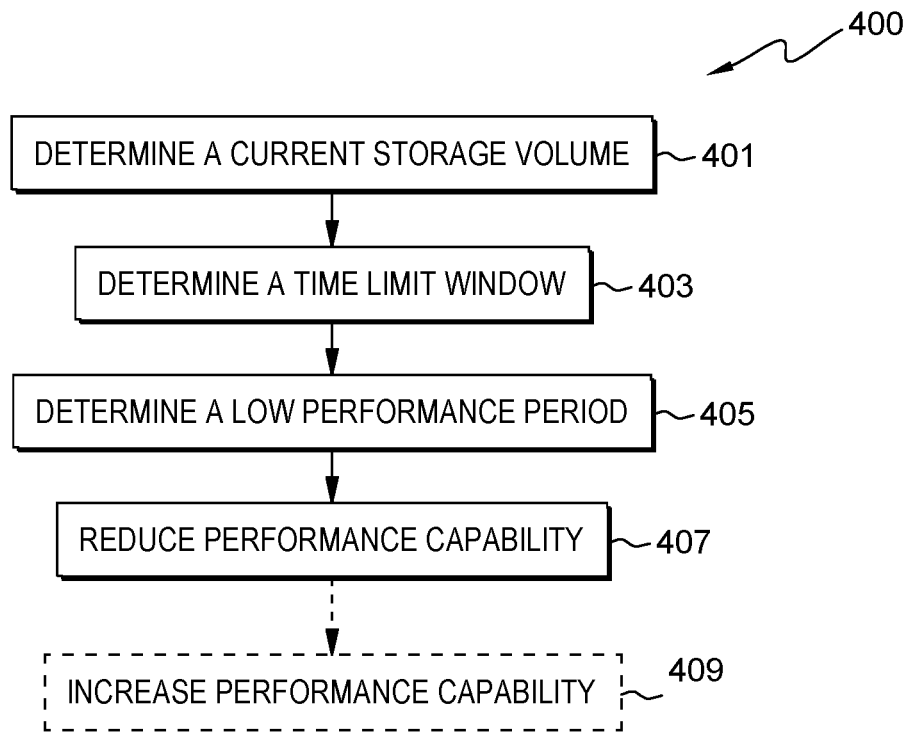
FIG. 4 illustrates a flowchart of a method for adjusting performance capability of a storage volume, in accordance with an embodiment of the present invention.

FIG. 4 illustrates flowchart 400 of a method for adjusting performance capability of a storage volume, in accordance with an embodiment of the present invention. At block 401, a current storage volume with a coherent workload pattern for storing data is determined. A periodic workload indicates regular periods (i.e., seasonal changes, hours changes) or regular bursts of the load in a punctual time. Similar data/instances can result in similar workload patterns, and different data/instances can result to different workload patterns. A storage volume is a virtual disk that provides persistent block storage space for instances. The storage volume can be determined based on the workload pattern; therefore, only data with the same/similar workload pattern (i.e., a "coherent" workload pattern) would be aggregated in one storage volume, while different workload patterns would be separated in different storage volumes. A cycle of a workload pattern may include a hot period and a cold period. The cold period of a cycle can be a period in which the I/O utilization is lower than that of the hot period within the cycle of the workload pattern. The following method steps can be performed to save the cost of the workload pattern in the current storage volume.

At block 403, a TLW of the current storage volume is determined. The TLW can determine the shortest time window for making an adjustment of the performance capability of a storage volume. A TLW, for example 6 hours, can be determined by the cloud storage provider, which can set the TLW to avoid frequent adjustment of performance capability, for example. Generally speaking, users of the cloud storage cannot adjust the performance capability within/during the TLW. After the TLW, users of cloud storage can change the performance capability as they need. But once the performance capability is changed, users need to wait for another TLW before changing again. In some instances, the cloud storage provider may use a TLW with the same length for all storage volumes it provides, while it could also use TLWs with different lengths (for example, 6 hours as TLW I for storage volume A, and 10 hours as TLW II for storage volume B) for different storage volumes it provides.

From a cloud storage user's perspective, if the user's workload decreases within the TLW, and there is no chance to adjust the performance capability provisioned by the storage volume, then the user has to pay for the storage volume at a high performance capability level in the cold period. This will cause expense waste and hence harm user experience. From a cloud storage provider's perspective, the TLW results in idle storage resources. It is, therefore, desired for an efficient approach to adjust performance capability in a timely matter so as to make the storage resources fit for the change of the workload.

At block 405, an LPP of the current storage volume is determined. The LPP is a period for serving the cold period at low performance capability based on the TLW. The LPP of the current storage volume is outside an initial TLW of the current storage volume. As such, the performance capability within the LPP can be adjusted from high to low, because the initial TLW has passed.

However, the LPP should be long enough to cover the length of the TLW so that a lowered performance capability can be increased again when the hot period of a subsequent cycle approaches. At block 407, in response to the LPP being no shorter than the TLW, the performance capability of the current storage volume is reduced within the LPP. At block 409, the performance capability of the workload is increased in response to the next hot period approaching. Block 409 is marked by dotted line to illustrate that this step can be performed within or outside the process in blocks 401-407.

Figure 9:
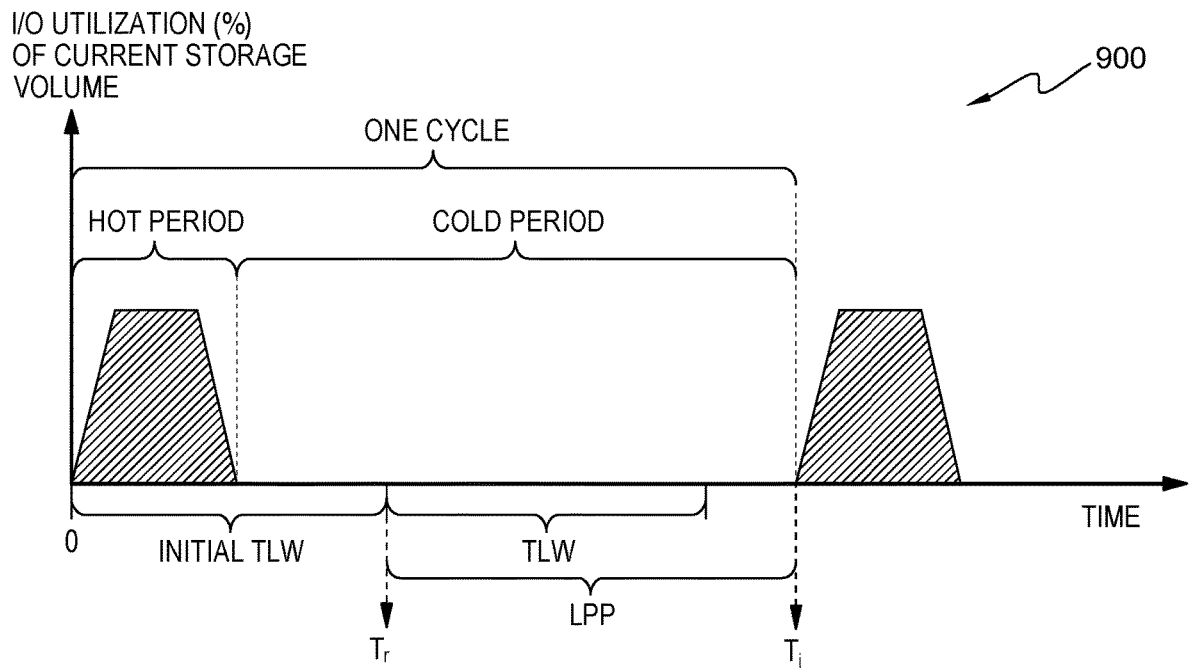
FIG. 9 illustrates an example diagram for adjusting performance capability by reducing performance capability, in accordance with an embodiment of the present invention.

FIG. 9 illustrates example diagram 900 for adjusting performance capability by reducing performance capability. A full cycle of the workload pattern is shown in FIG. 9, which includes a hot period of a workload and a cold period of the workload. The cycle starts from the hot period and moves towards the cold period as shown. During the hot period, performance capability is kept at a high level, which is measured by, for example, IOPS (Input/Output per second), provisioned by the current storage volume. When the workload enters into the cold period, because the TLW has not come to an end, no adjustment of performance capability can be made. Such status continues until Tr, at which point the LPP starts to grow from 0. Performance capability of the workload, therefore, can be reduced from the moment of Tr to a low level for the purpose of reducing cost in the cold period (referring to step 407 in FIG. 4). And the performance capability can be kept low until Ti, when the hot period of a subsequent cycle is coming, after which the performance capability can be increased to the high level to fit for the requirement of high workload at the hot period (referring to step 409 in FIG. 4).

It should be noted that the LPP is great than or equal to (i.e., no shorter than) the TLW, so that there is enough time for the performance capability to be increased at the moment of Ti. Therefore the total LPP in FIG. 9 starts from the end of the initial TLW and ends at the beginning of the hot period of a subsequent cycle, which is for serving the cold period at low performance capability based on the TLW.

Figure 10:
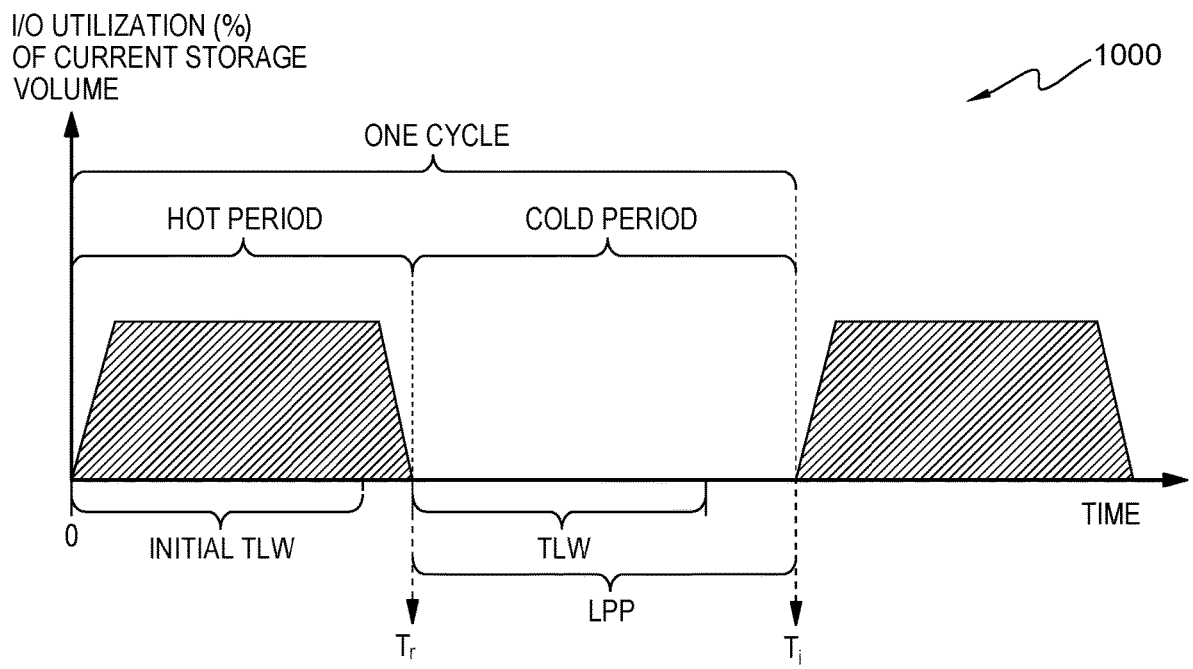
FIG. 10 illustrates another example diagram for adjusting performance capability by reducing performance capability, in accordance with an embodiment of the present invention.

FIG. 10 illustrates example diagram 1000 for adjusting performance capability by reducing the performance capability, in accordance with an embodiment of the present invention. Different from FIG. 9, the hot period in FIG. 10 is longer than the TLW. Once the hot period ends, the performance capability, can, therefore, be reduced to low, as shown at time Tr (referring to step 407 in FIG. 4). In response to the hot period of a subsequent cycle approaching, the performance capability can be further increased at the moment of Ti (referring to step 409 in FIG. 4). The LPP in FIG. 10 starts from the end of the hot period and ends at the beginning of the hot period of a subsequent cycle, and as such is for serving the cold period at low performance capability based on the TLW.

Figure 5:
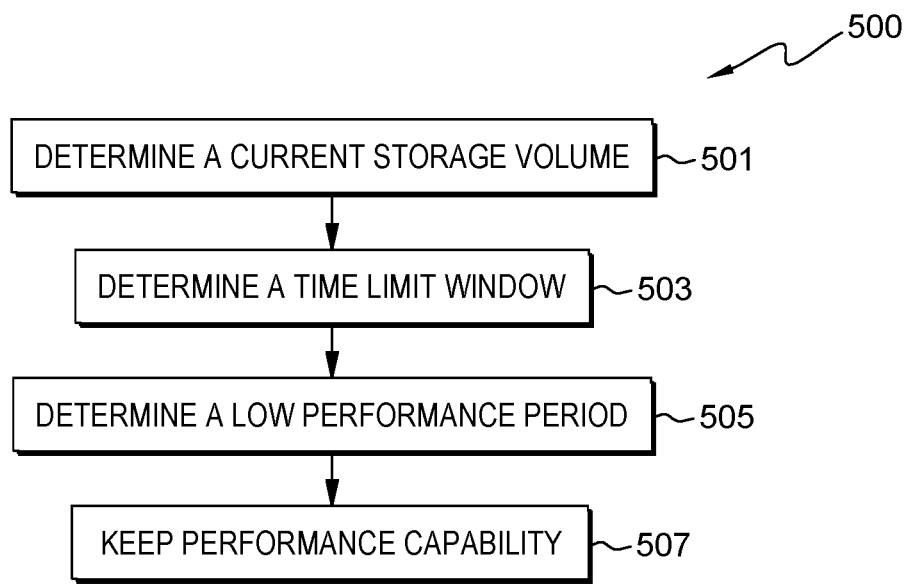
FIG. 5 illustrates a flowchart of another method for adjusting performance capability of a storage volume, in accordance with another embodiment of the present invention.

FIG. 5 illustrates flowchart 500 of another method for adjusting performance capability for a storage volume, in accordance with an embodiment of the present invention. Blocks 501, 503, 505 in FIG. 5 are the same as blocks 401, 403 and 405 in FIG. 4, respectively; therefore, details of blocks 501-505 in FIG. 5 can be referred to in the description of blocks 401-405 in FIG. 4 above. At block 507, in response to the LPP being shorter than the TLW, where there is not enough time to increase the performance capability once it is reduced, performance capability of the current storage volume will be maintained without any change.

Figure 11:
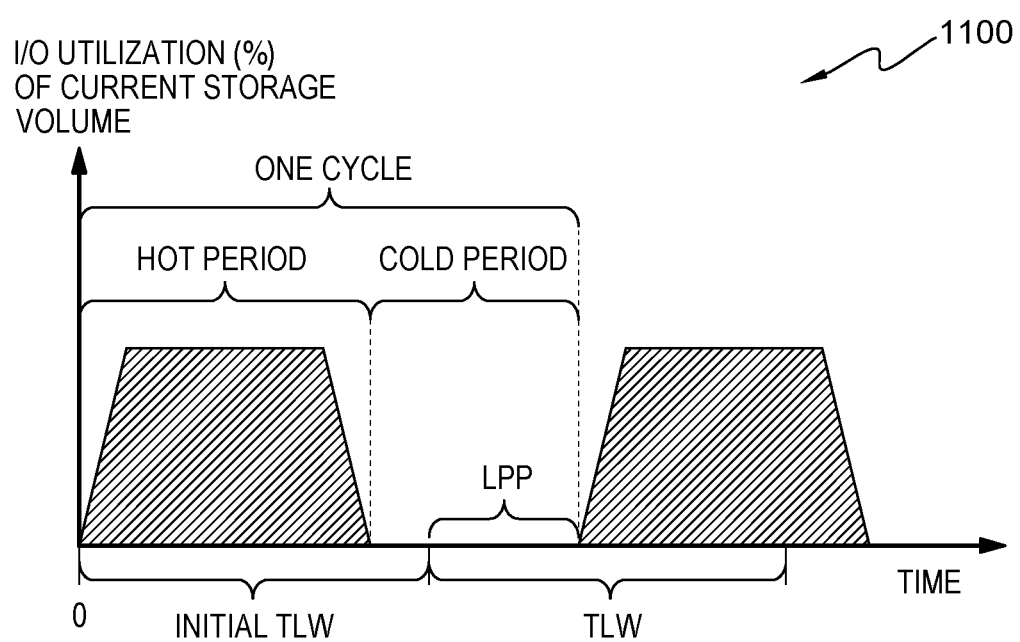
FIG. 11 illustrates yet another example diagram for adjusting performance capability by reducing performance capability, in accordance with an embodiment of the present invention.

FIG. 11 illustrates example diagram 1100 for adjusting performance capability by reducing performance capability, in accordance with an embodiment of the present invention. The cycle of the workload pattern in FIG. 11 is characteristic of a relatively long hot period and a relatively short cold period; therefore, although LPP is greater than 0, it cannot exceed the TLW, which means there is not enough time to adjust low performance capability from low to high again when the hot period of a subsequent cycle approaches. Therefore, performance capability will be kept without adjustment in this scenario (referring to block 507 of FIG. 5).

Figure 6:
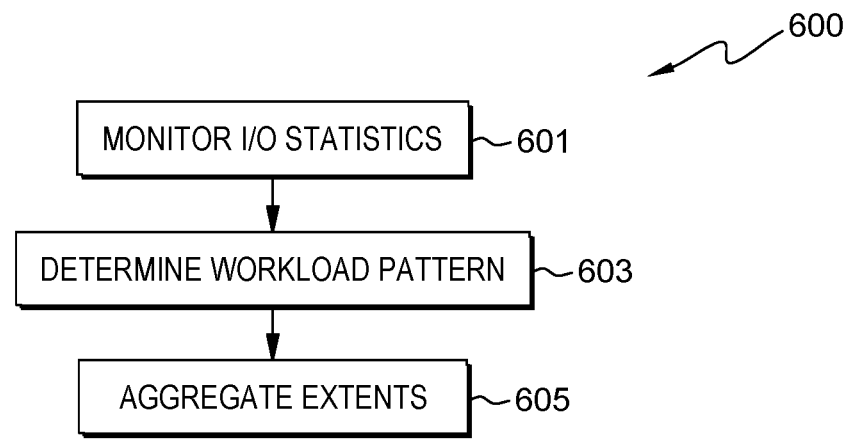
FIG. 6 illustrates a flowchart of a method for determining the current storage volume, in accordance with another embodiment of the present invention.

FIG. 6 illustrates flowchart 600 of a method for determining the current storage volume (such as in step 401 in FIG. 4, or 501 in FIG. 5), in accordance with an embodiment of the present invention. At block 601, I/O statistics (for example TOPS) of stored data are monitored per extent (each extent can be a fixed size, for example 1 GB). At block 603, a workload pattern for each one of multiple extents can be determined, so as to find a workload pattern with similar length of cycle, similar length of hot period, similar high performance capability in the hot period, similar length of cold period, similar low performance capability in the cold period, etc. At block 605, extents with similar workload patterns can be aggregated into the same storage volume (storage volume can be larger than the extent, for example 64 GB) to achieve better data placement and adjust performance at finer granularity. Therefore, each storage volume for storing data can provide service for a coherent workload pattern, and performance capability can be adjusted with the same approach for all data in the same storage volume, regardless of whether the data is from the same user.

Figure 7:
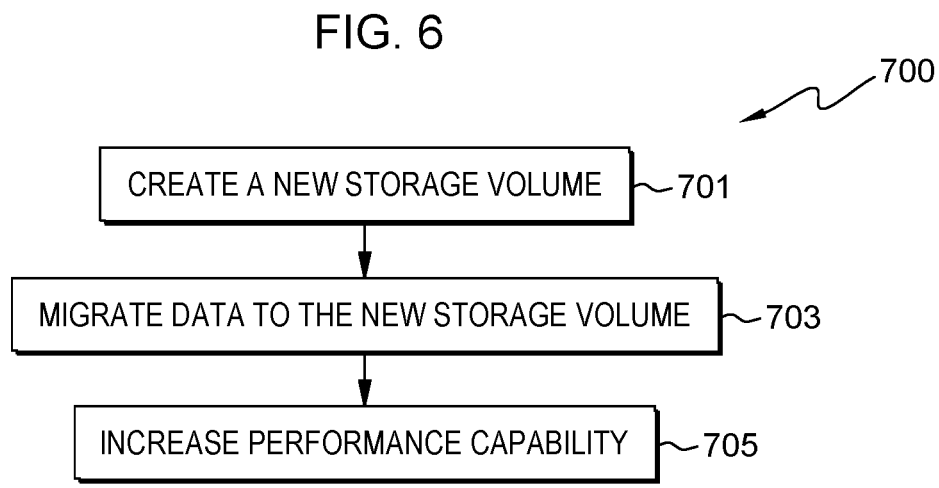
FIG. 7 illustrates a flowchart of a method for adjusting performance capability by creating a new storage volume, in accordance with an embodiment of the present invention.

FIG. 7 illustrates flowchart 700 of a method for adjusting performance capability by creating a new storage volume, in accordance with an embodiment of the present invention. If the LPP of the current storage volume is less than the TLW, although performance adjustment cannot be achieved in the current storage volume, performance adjustment might be achieved by leveraging another storage volume, namely a new storage volume.

Figure 12:
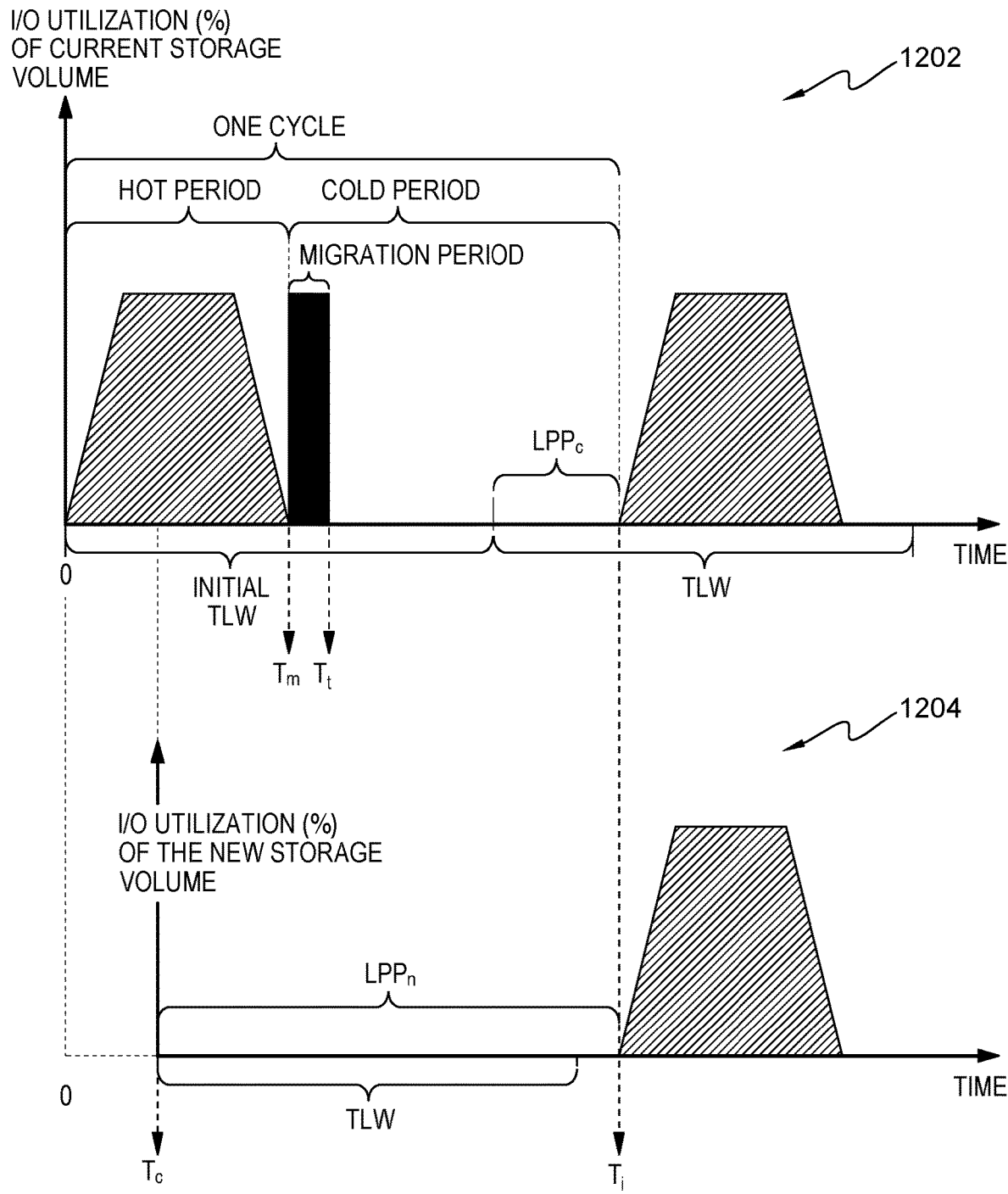
FIG. 12 illustrates an example diagram for adjusting performance capability by creating a new storage volume, in accordance with an embodiment of the present invention.

Now steps in FIG. 7 will be illustrated in detail with reference to FIG. 12, which illustrates example diagrams, namely upper diagram 1202 and lower diagram 1204, for adjusting performance capability by creating a new storage volume. The LPP of the current storage volume (hereinafter LPPc) starts from the end of the initial TLW in the current storage volume and ends with the beginning of the next hot period. In this embodiment, the LPPc is shorter than the TLW. Therefore, the approach of self-adjustment described above with reference to FIG. 9/10 cannot be applied in this scenario. However, if a new storage volume is established to take over the service in the current storage volume, and if the LPP in the new storage volume (hereinafter LPPn) is greater than the TLW (as shown in FIG. 12), then there is enough time for adjusting the LPP in the new storage volume from low to high before the next hot period, and the cost between the original approach (not making any adjustment of the performance capability) and the new approach (establishing a new storage volume to take over all data from the current storage volume) could be compared to see if there are cost savings. If the cost is saved, data could be migrated from the current storage volume to the new storage volume and service in the current storage volume could be terminated.

In FIG. 12, upper diagram 1202 shows performance capability provisioned in the current storage volume where one cycle includes a hot period and a cold period. Lower diagram 1204 of FIG. 12 shows performance capability provisioned in the new storage volume.

At block 701, the new storage volume can be created within the hot period of the workload pattern and can provision low performance capability compared with that of the current storage volume. The time for creating the new storage volume is indicated by Tc in FIG. 12. The new storage volume should be ready before data migration during the cold period; therefore, it has to be created within the hot period. In order to have the LPPn greater than the TLW, the new storage volume has to be established at latest at a time with TLW length prior to the beginning of the next hot period.

At block 703, within the cold period, data in the current storage volume can be migrated to the new storage volume which is set on a low performance capability in response to the following conditions being satisfied: (1) LPPc being less than the TLW, (2) LPPn being no shorter than the TLW, and (3) cost is saved if use of the current storage volume is terminated. The migration period shown in FIG. 12 starts from time Tm (which is also the ending time of the hot period) and ends at time Tt. After Tt, the current storage volume will be terminated (the corresponding step is not shown in FIG. 7). Low performance capability is provisioned to the new storage volume during the cold period. If the use of the current storage volume is terminated early, before the end of the initial TLW, it is assumed that the cost in the current storage volume will end as well (i.e., no further cost will be charged in the current storage volume for the rest of the cycle).

Referring now to Formulas (1)-(3), described below, details are provided regarding how to decide whether cost savings have occurred. Costmigration0 in formula (1) indicates cloud storage cost without any migration, which could be measured by, for example, USD. CostPcurr indicates a cost of performance capability provisioned per time unit of the current storage volume, for example XXX USD/second. CostC indicates the cost of space capacity usage per time unit of the storage volume. Ti indicates time duration of a full cycle as shown in FIG. 12, and also indicates the beginning of the next hot period.

Still referring to Formulas (1)-(3), below, CostPnew indicates cost of performance capability provisioned per time unit of the new storage volume. CostPcurr could be higher than that of CostPnew because the current storage volume provisions higher performance capability than that provisioned by the new storage volume. If data is migrated from the current storage volume to the new storage volume as illustrated in FIG. 7, the total cost Costmigration1 in formula (2) can include two parts: the first part is the cost of the current storage volume which covers the time duration from 0-Tt and the second part is the cost of the new storage volume which covers the time duration from Tc to Ti. If the result of formula (3), Costmigration0-Costmigration1, is greater than a Threshold 1, for example 0 (i.e., cost is saved if data is migrated to the new storage volume) then the third condition of migration in block 703 of FIG. 7 can be satisfied. It should be noted that Threshold 1 is not necessarily 0, and that data migration will be performed only when enough cost saving can be achieved.

Formulas (1)-(3)

$$\text{Costmigration0} = Ti*(\text{Cost}P\text{curr} + \text{Cost}C) \quad (1)$$

$$\text{Costmigration1} = Tt*(\text{Cost}P\text{curr} + \text{Cost}C) + (Ti - Tc)*(\text{Cost}P\text{new} + \text{Cost}C) \quad (2)$$

$$\text{Costmigration0} - \text{Costmigration1} > \text{Threshold1} \quad (3)$$

At block 705, the performance capability of the new storage volume can be increased to a high level again in response to the hot period of a subsequent cycle approaching (referring to the time Ti in FIG. 12). The next hot period, illustrated with a dotted line in the current storage volume of FIG. 12, indicates the corresponding workload will not be actually performed in the current storage volume; instead, it will be performed in the new storage volume as the data has been migrated to the new storage volume and the current storage volume has been terminated.

Figure 8:
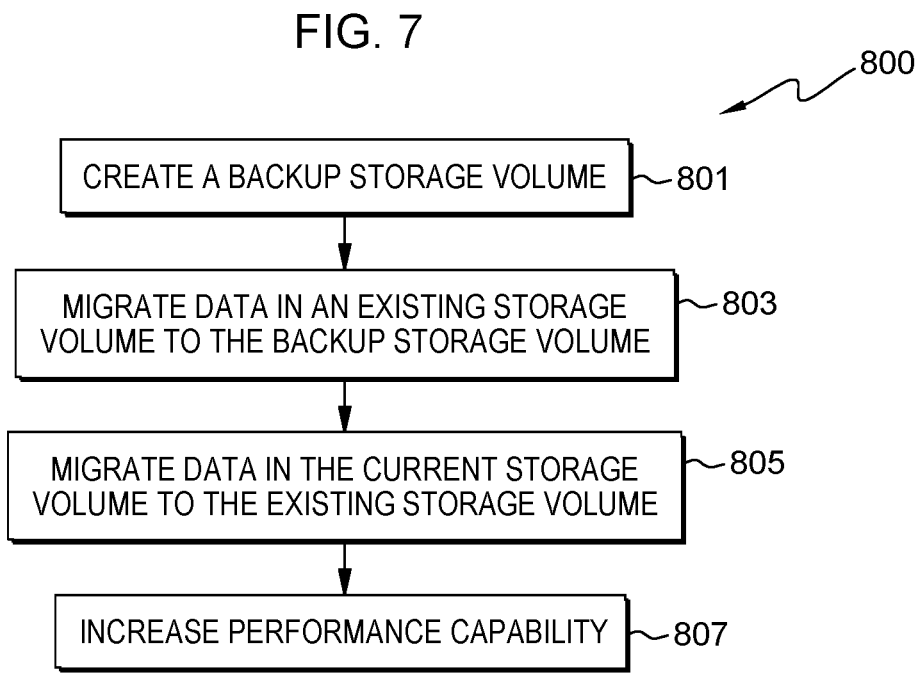
FIG. 8 illustrates a flowchart of a method for adjusting performance capability by migrating data to an existing storage volume, in accordance with an embodiment of the present invention.

For situations where an LPPn greater than TLW, which can enable a new storage volume to be created during the hot period, cannot be found, another embodiment is provided in FIG. 8, which depicts flowchart 800 for migrating data from the current storage volume to an existing storage volume while migrating data in the existing storage volume to a backup storage volume. Steps of flowchart 800 of FIG. 8 will be described with reference to FIG. 13 together.

Figure 13:
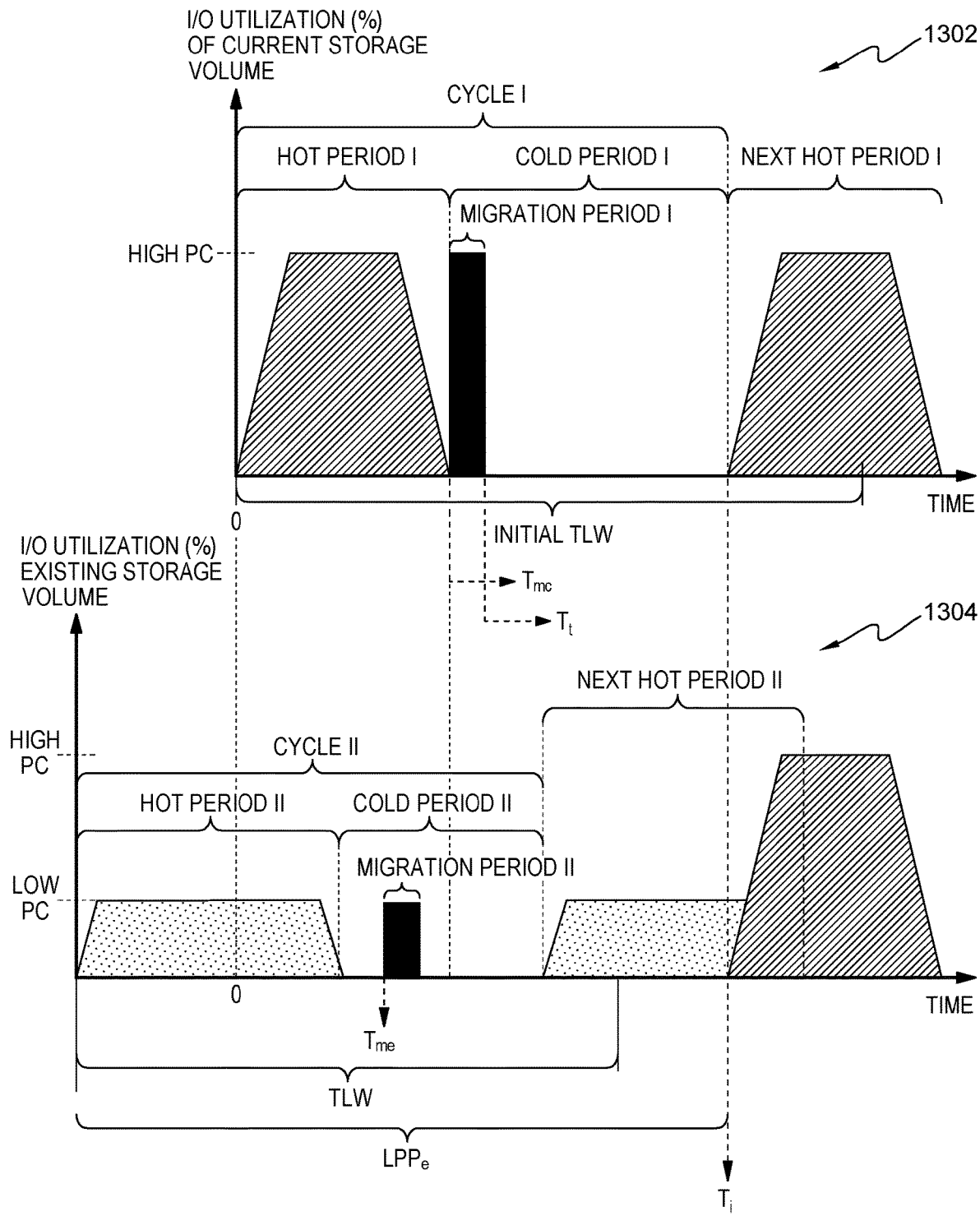
FIG. 13 illustrates an example diagram for adjusting performance capability by migrating data to an existing storage volume, in accordance with an embodiment of the present invention.

In FIG. 13, upper diagram 1302 shows performance capability provisioned in the current storage volume within which cycle I includes hot period I and cold period I of the workload pattern in the current storage volume. Lower diagram 1304 of the FIG. 13 shows performance capability provisioned in the existing storage volume within which cycle II includes hot period II and cold period II for the workload pattern originally stored in the existing storage volume. Next hot period I of the workload in the current storage volume is shown with a dotted line, as the data in the current storage volume will be migrated from the current storage volume to the existing storage volume when the next hot period I is coming. Next hot period II of the workload originally in the existing storage volume is shown via dotted line as well, as the data in the next hot period II of the existing storage volume will be migrated from the existing storage volume to the backup storage volume (which is not shown).

At block 801, a backup storage volume is created within the hot period, wherein the performance capability of the backup storage volume is similar to that of the existing storage volume, so that data stored in the existing storage volume at low performance capability can be migrated to the backup storage volume, which can continue to provision low performance capability. The existing storage volume can provision low performance capability compared with that of the current storage volume, which can fit a need of data stored in the existing storage volume. Additionally, as there may not be a need to frequently adjust performance capability in the existing storage volume, performance capability in the existing storage volume can be maintained at the low level for a time that is longer than the TLW.

At block 803, data in the existing storage volume is migrated into the backup storage volume within the hot period to empty the existing storage volume and be ready for taking over data from the current storage volume during the cold period. Data migration is performed during the cold period so as to maintain stability and performance during the hot period.

At block 805, within the cold period, more specifically within migration period I (starting from Tmc and ending at Tt), data in the current storage volume is migrated to the existing storage volume, which provisions low performance capability compared to that of the current storage volume, in response to the following conditions being satisfied: (1) the LPP of the current storage volume is less than the TLW (for example, as shown in FIG. 13, the cycle of the workload pattern on the current storage volume is too short, even shorter than the TLW, therefore the LPP in the current storage volume is 0); (2) the LPP of the existing storage volume is no shorter than the TLW (for example, as shown in FIG. 13, LPPc indicates the LPP in the existing storage volume is longer than TLW, therefore, when the next hot period is approaching, there is enough time to increase the performance capability in the existing storage volume); and (3) cost is saved if use of the current storage volume is terminated. If use of the current storage volume is terminated early, before the end of the initial TLW, it can be assumed that the incurring of cost in the current storage volume will be ended as well, and that no further cost will be charged in the current storage volume for the rest of the cycle.

Referring now to formulas (4)-(6), described below, details are provided regarding how to decide whether the cost is saved. Costmigration0 in formula (4) indicates cloud storage cost without any migration. CostPcurr indicates cost of performance capability provisioned per time unit of the current storage volume. CostC indicates the cost of space capacity usage per time unit of the storage volume. A full cycle (cycle I) of the workload pattern in the current storage volume is from time 0 to Ti as shown in FIG. 13. Ti indicates a time of increasing the performance capability when the next hot period begins.

Still referring to formulas (4)-(6), below, CostPback indicates cost of performance capability provisioned per time unit in the backup storage volume. CostPcurr is higher than that of CostPback because the current storage volume provisions higher performance capability than that provisioned by the backup storage volume. For the situation where data is migrated from the current storage volume to the existing storage volume, as illustrated in FIG. 7, the total cost, Costmigration2 (shown in formula (5)), includes two parts: the first part is the cost of the current storage volume which covers time duration from 0 to Tt, and the second part is the cost of the backup storage volume which covers time duration from Tme to Ti. Tme indicates a time to migrate data in the existing storage volume to the backup storage volume. And migration period II indicates a period for migrating data from the existing storage volume into the backup storage volume.

Referring still to formulas (4)-(6), it should be noted that the calculation of Costmigration2 does not consider the cost of the existing storage volume within cycle I or cycle II. This is because the existing storage volume continues to provision low performance capability, regardless of whether the data is migrated from the current storage volume to the existing storage volume. Therefore, the cost of existing storage volume is a constant not a variable. As shown in the comparison between Costmigration0 and Costmigration2 (see formula (6), below), the cost of the existing storage volume can be offset during the comparison.

If the result of formula (6), Costmigration0-Costmigration2, is greater than a Threshold 2, for example 0 (i.e., the cost is saved if data is migrated to the existing storage volume), then the third condition of migration in block 805 of FIG. 8 is satisfied. It should be noted that Threshold 2 does not necessarily need to be 0, and that it can be a number greater than 0, so that data migration can be performed only when enough cost saving can be achieved.

Formulas (4)-(6)

$$\text{Costmigration0} = Ti^*(\text{Cost}P\text{curr} + \text{Cost}C) \quad (4)$$

$$\text{Costmigration2} = Tt^*(\text{Cost}P\text{curr} + \text{Cost}C) + (Ti - Tme)^* (\text{Cost}P\text{back} + \text{Cost}C) \quad (5)$$

$$\text{Costmigration0} - \text{Costmigration2} > \text{Threshold2} \quad (6)$$

After the time of Tt, the current storage volume can be terminated (the corresponding step is not shown in FIG. 8), and the corresponding cost can be saved.

At block 807, the performance capability of the existing storage volume is increased in response to the next hot period approaching, referring to the time Ti in FIG. 13. Until this point, performance adjustment within one cycle of the workload pattern can be completed.

It should be noted that "high performance capability" and "low performance capability" are a pair of terms defined by their relationship to each other, and they do not indicate any specific value of performance capability of a storage volume.

It should also be noted that the method or system of adjusting performance capability of a storage volume according to embodiments of this disclosure could be implemented by computer system/server 12 of FIG. 1, any computing node in FIG. 2 or any component in FIG. 3.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may indicate a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by one or more computer processors, a current storage volume to store data having a workload pattern, wherein a cycle of the workload pattern includes a hot period and a cold period;
    determining, by one or more computer processors, a time limit window of the current storage volume, wherein the time limit window is a shortest time window within which performance capability of the current storage volume is to be kept without adjustment;
    determining, by one or more computer processors, a low performance period of the current storage volume corresponding to the cold period;
    in response to the low performance period being greater than the time limit window, reducing, by one or more computer processors, the performance capability of the current storage volume during the low performance period; and
    in response to a second low performance period, corresponding to a cold period of a subsequent cycle, being less than the time limit window, maintaining, by one or more computer processors, the performance capability of the current storage volume during the second low performance period.

2. The computer-implemented method of claim 1, wherein the cold period of the cycle is a period in which Input/Output (I/O) utilization is lower than I/O utilization of the hot period of the cycle.

3. The computer-implemented method of claim 1, further comprising:
    increasing, by one or more computer processors, the performance capability of the current storage volume in response to a hot period of the subsequent cycle approaching.

4. The computer-implemented method of claim 1, further comprising:
    migrating, during the cold period of the subsequent cycle, by one or more computer processors, data in the current storage volume to a new storage volume, wherein the new storage volume is configured to have a lower performance capability than the performance capability of the current storage volume, and wherein the migrating is performed in response to:
    (i) the second low performance period of the current storage volume being less than the time limit window,
    (ii) a low performance period of the new storage volume being greater than the time limit window, and
    (iii) cost being saved when use of the current storage volume is terminated.

5. The computer-implemented method of claim 4, further comprising:
creating, by one or more computer processors, the new storage volume during the hot period of the cycle.

6. The computer-implemented method of claim 4, further comprising:
increasing, by one or more computer processors, the performance capability of the new storage volume in response to a hot period of the subsequent cycle approaching.

7. The computer-implemented method of claim 1, further comprising:
migrating, during the cold period of the subsequent cycle, by one or more computer processors, data in the current storage volume to an existing storage volume, wherein the existing storage volume is configured to have a lower performance capability than the performance capability of the current storage volume, and wherein the migrating is performed in response to:
(i) the second low performance period of the current storage volume being less than the time limit window,
(ii) a low performance period of the existing storage volume being greater than the time limit window, and
(iii) cost being saved when use of the current storage volume is terminated.

8. The computer-implemented method of claim 7, further comprising:
creating, by one or more computer processors, a backup storage volume during the hot period of the cycle, wherein a performance capability of the backup storage volume is similar to the performance capability of the existing storage volume; and
migrating, by one or more computer processors, data in the existing storage volume to the backup storage volume during the hot period of the cycle.

9. The computer-implemented method of claim 7, further comprising:
increasing, by one or more computer processors, the performance capability of the existing storage volume in response to a hot period of the subsequent cycle approaching.

10. The computer-implemented method of claim 1, wherein the determining of the current storage volume comprises:
monitoring, by one or more computer processors, Input/Output (I/O) statistics of stored data per extent;
determining, by one or more computer processors, a corresponding workload pattern for each extent of a plurality of extents; and
aggregating, by one or more computer processors, extents with a similar workload pattern into a same storage volume.

11. A computer system comprising:
one or more processors;
a memory coupled to at least one of the processors; and
a set of computer program instructions stored in the memory and executed by at least one of the processors to perform a method comprising:
determining a current storage volume to store data having a workload pattern, wherein a cycle of the workload pattern includes a hot period and a cold period;
determining a time limit window of the current storage volume, wherein the time limit window is a shortest time window within which performance capability of the current storage volume is to be kept without adjustment;
determining a low performance period of the current storage volume corresponding to the cold period;
in response to the low performance period being greater than the time limit window, reducing the performance capability of the current storage volume during the low performance period; and
in response to a second low performance period, corresponding to a cold period of a subsequent cycle, being less than the time limit window, maintaining the performance capability of the current storage volume during the second low performance period.

12. The computer system of claim 11, wherein the method further comprises:
increasing the performance capability of the current storage volume in response to a hot period of the subsequent cycle approaching.

13. The computer system of claim 11, wherein the method further comprises:
migrating, during the cold period of the subsequent cycle, by one or more computer processors, data in the current storage volume to a new storage volume, wherein the new storage volume is configured to have a lower performance capability than the performance capability of the current storage volume, and wherein the migrating is performed in response to:
(i) the second low performance period of the current storage volume being less than the time limit window,
(ii) a low performance period of the new storage volume being greater than the time limit window, and
(iii) cost being saved when use of the current storage volume is terminated.

14. The computer system of claim 11, wherein the method further comprises:
migrating, during the cold period of the subsequent cycle, by one or more computer processors, data in the current storage volume to an existing storage volume, wherein the existing storage volume is configured to have a lower performance capability than the performance capability of the current storage volume, and wherein the migrating is performed in response to:
(i) the second low performance period of the current storage volume being less than the time limit window,
(ii) a low performance period of the existing storage volume being greater than the time limit window, and
(iii) cost being saved when use of the current storage volume is terminated.

15. The computer system of claim 11, wherein the cold period of the cycle is a period in which Input/Output (I/O) utilization is lower than I/O utilization of the hot period of the cycle.

16. A computer program product comprising a computer readable storage medium having program instructions embodied therewith, the program instructions being executable by a computer to cause the computer to perform a method comprising:
determining a current storage volume to store data having a workload pattern, wherein a cycle of the workload pattern includes a hot period and a cold period;
determining a time limit window of the current storage volume, wherein the time limit window is a shortest time window within which performance capability of the current storage volume is to be kept without adjustment;
determining a low performance period of the current storage volume corresponding to the cold period;

in response to the low performance period being greater the time limit window, reducing the performance capability of the current storage volume during the low performance period; and in response to a second low performance period, corresponding to a cold period of a subsequent cycle, being less than the time limit window, maintaining the performance capability of the current storage volume during the second low performance period.

17. The computer program product of claim 16, wherein the method further comprises:

increasing the performance capability of the current storage volume in response to a hot period of the subsequent cycle approaching.

18. The computer program product of claim 16, wherein the method further comprises:

migrating, during the cold period of the subsequent cycle, by one or more computer processors, data in the current storage volume to a new storage volume, wherein the new storage volume is configured to have a lower performance capability than the performance capability of the current storage volume, and wherein the migrating is performed in response to:
(i) the second low performance period of the current storage volume being less than the time limit window,
(ii) a low performance period of the new storage volume being greater than the time limit window, and
(iii) cost being saved when use of the current storage volume is terminated.

19. The computer program product of claim 16, wherein the method further comprises:

migrating, during the cold period of the subsequent cycle, by one or more computer processors, data in the current storage volume to an existing storage volume, wherein the existing storage volume is configured to have a lower performance capability than the performance capability of the current storage volume, and wherein the migrating is performed in response to:
(i) the second low performance period of the current storage volume being less than the time limit window,
(ii) a low performance period of the existing storage volume being greater than the time limit window, and
(iii) cost being saved when use of the current storage volume is terminated.

20. The computer program product of claim 16, wherein the cold period of the cycle is a period in which Input/Output (I/O) utilization is lower than I/O utilization of the hot period of the cycle.

* * * * *